३,१३५,६८७
PROCESS FOR PURIFYING WASTE-WATER
Hermann Jung, 23 Burgstrasse, and Walter Schroeder, 18 Wolfskull, both of Viersen, Germany
Filed Dec. 28, 1960, Ser. No. 78,856
Claims priority, application Germany Dec. 31, 1959
3 Claims. (Cl. 210—47)

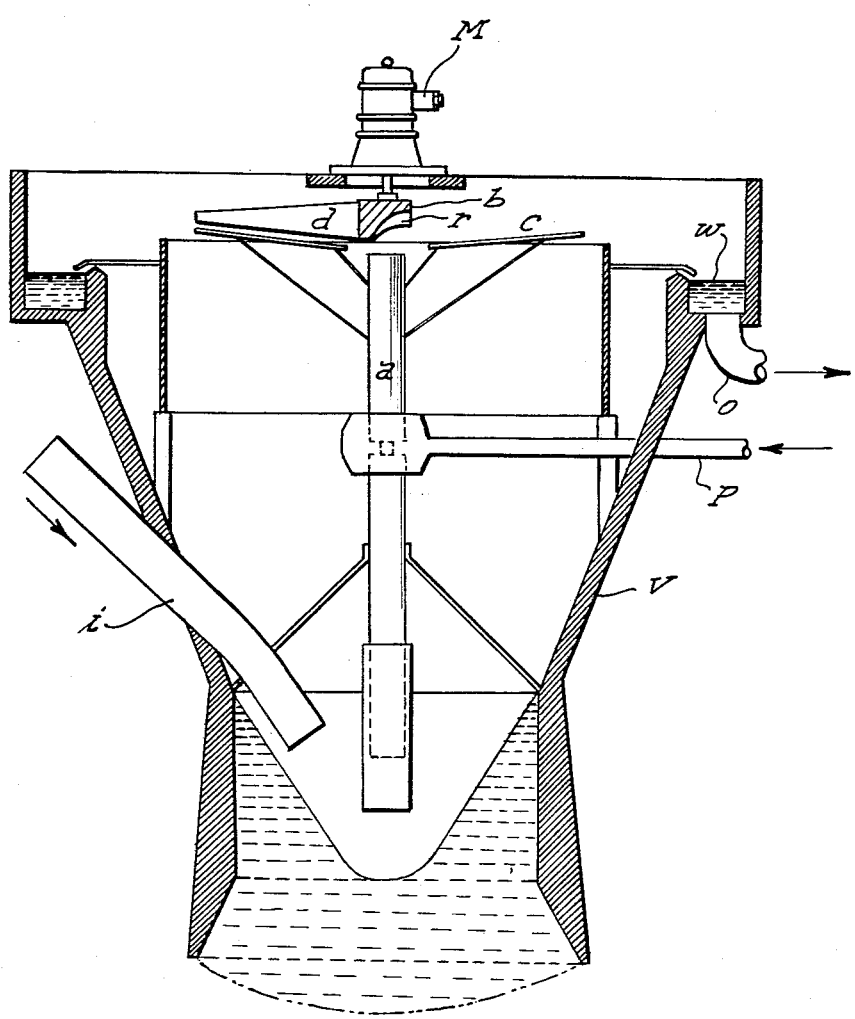

This invention relates to a process for the purification of waste water by means of metallic iron. By dissolving metallic iron and by its conversion into oxide or hydroxide in a liquid or aqueous medium it is possible, for instance, in waste water to achieve chemical precipitations, the ferrous or ferric hydroxide formed serving in the nescent state as a precipitating agent. In other cases of waste water purification, which will be referred to in greater detail in the following, the dissolution of the iron in the waste water to be purified may be of importance as well. A particular object of the present invention is a process in which the dissolution or conversion of the iron takes place at a relatively high speed and in which passivation is avoided to a large extent.

The process according to the present invention consists of a combination of the following operational steps: The waste water to be purified is introduced into a vessel, and iron chips are added to the waste water contained in the vessel. A portion of the iron chips added is always drawn repeatedly off from near the bottom of the vessel in the form of a mixture of liquid and solids. From this mixture, solids are mechanically separated in the manner described in the following in greater detail, and the other components of the mixture are recycled into the vessel. The solids separated by means of a magnetic separator, a sieve or the like are exposed to the influence of oxygen by treating them with air or another oxygen-containing gas and then returning them to the vessel. Finally, the iron-containing waste water is discharged from the container.

The introduction of the waste water to be purified into the vessel may be carried out continuously and the addition of iron chips to the waste water contained in the vessel may be carried out periodically. The waste water is then preferably discharged from this vessel by means of an overflow, the quantity corresponding to the waste water feed. The precipitated settleable solids contained in the waste water discharged may be separated in a subsequent settling basin.

The process described above may also be used for purifying waste water biochemically. It is carried out at first substantially in the manner described above. There is, however, no complete precipitation in the vessel, but the iron is wholly or partly dissolved in the waste water. In contrast to the process described above, it is the final operational step to convey the iron-containing waste water to a subsequent biological purification plant, for instance to an activated sludge plant or a trickling filter plant. In this case, the presence of the iron favors the biological purification, so that, altogether, it is possible to speak of a "biochemical purification plant." The term "iron-containing" as used in the present specification is intended to cover the active iron-containing components contained in the waste water. These include dissolved and/or undissolved ferrous or ferric hydroxide. Biological purification plants are disclosed in German Patent No. 840,980, granted to Hermann Jung on June 9, 1952.

In processes known heretofore the waste water is fed to a funnel-like vessel and iron chips are added which together with part of the waste water are circulated by means of pumps or other means. The mixture of iron chips and waste water is thus lifted above the water level and atomized there. It is thus enriched with oxygen. The oxidating effect thus taking place can still be reinforced in a known manner by conveying the iron chips by means of compressed air lifters.

Experience has shown, however, that in this process the dissolution or the conversion, respectively, of the iron takes place at a relatively low speed. Passivation occurs as well. Consequently, relatively long contact periods, large vessels, and considerable power for circulation are required in order to dissolve a certain amount of metallic iron or to achieve a certain precipitation effect, respectively.

The present invention is based on the idea that the conversion of the iron takes place more quickly and without any substantial delay by passivation, when the metallic iron is removed from the liquid phase for a certain time by taking it out of the mixture of waste water and iron chips. It will then be possible for the surface of the metal particles to dry, at least partly, and to be exposed to the immediate action of the air or the oxygen, respectively. When the surface of the iron chips dries, the waste water film which surrounds them and which exercises a passivating effect is torn open, and the structure of the surface of the iron chips is so influenced that the oxygen can act more strongly. This results in a quicker and homogeneous dissolution or conversion, respectively, of the iron chips when they are returned to the waste water.

Experiments have shown that the process described above makes it possible to carry out the iron conversion process in about half the time, and in special cases even within a fraction of the time required by the processes known so far. It has thus been rendered possible to use for the iron conversion correspondingly smaller vessels and circulation means. This reduces both the construction as well as the operating costs.

A further advantage of the process according to the present invention consists in the fact that only a considerably lower circulation of the mixture of waste water and iron chips is required. Hereto circulation had to be very violent in order to reduce passivation. Reduction of circulation means a further reduction of the power required. Additionally, too strong and too quick disintegration of the metal particles is thus avoided. This saves costs, because the rinsing out of extremely fine metal particles from the vessels, which are normally operated by continuous throughflow, is thus eliminated to a large extent.

There are various possibilities for applying the process in practice. The single figure of the drawing illustrates partly schematically and partly in section an embodiment of a device used in the process according to the invention. A funnel-like vessel $v$, provided with an inlet $i$ and outlet $o$, has in its vertical central axis a compressed air lifter $a$ the bottom end of which extends down to about the funnel base. Compressed air is supplied through inlet $p$. The upper end of the compressed air lifter extends to above the waste water level $w$. Above the compressed air lifter there is a provided device $b$ having the form of a bend and being equipped with a groove-like recess $r$ open to below. This deflecting device is connected with a driving motor $m$ the axis of which coincides with the vertical central axis of the funnel-like vessel $v$. Above the water level there is provided a circular plate $c$ which is provided with holes or slots or which is designed in the form of a grate. The deflecting device $b$ has attached to it, in radial direction, a stripping ledge $d$. The compressed air lifter moves the iron chips located at the base of the vessel together with part of the waste water and sprays them against the deflecting device. The latter causes the jet consisting of the waste water liquid and the iron chips to pour on to a small section of the circular plate $c$. The greater part of the iron chips remains on the plate for treatment by means of an oxygen-containing gas, particularly by means of air. The waste water and the residual iron particles flow back into the funnel-like vessel. The deflecting device and the stripping ledge attached to it are slowly rotated, so that the jet conveyed by the compressed air lifter is again and again deflected to different sectors of the circular plate. After one revolution of the deflecting device, the entire plate will be covered with iron chips. The chips which are not under the immediate influence of the jet are stored freely in the air and are exposed to the action of the oxygen of the air. The time of contact of the chips with the oxygen of the air can be controlled by selecting the speed of the driving motor. The treatment of the iron chips may be intensified for instance by blowing hot air over the circular plate.

During the revolution of the deflecting device, the ledge moves the iron chips lying on the circular plate through the holes and slots in the plate back into the waste water vessel. The iron chips sink to the bottom of the vessel and are again circulated by means of the compressed air lifter. The upper part of the funnel-like vessel contains an overflow at the outer rim of the inner space. From there, the waste water carrying the precipitations or the dissolved iron, respectively, is normally conveyed to a subsequent purification plant where the separation of the precipitated solids or the biochemical purification can take place. In the case of biochemical purification it will often be sufficient for only part of the water to be purified to be passed through the funnel-like vessel and to be enriched there with dissolved iron.

In the respective plants for the purification of waste water which have so far been known, the mixture of iron chips and waste water conveyed by the compressed air lifter is sprayed above the water level into the air in all directions. The mixture conveyed is then immediately returned to the waste water again, so that there is hardly any time for the air to act on the iron chips and little opportunity for the absorption of oxygen.

The individual operational steps may, of course, also be combined in one single vessel. For instance, the groove following the overflow may be designed as a settling basin.

Having now particularly described and ascertained the nature of our said invention and in what manner the same is to be performed, we declare that what we claim is:

1. In a process of purifying waste water by means of iron, the combination of the following steps: introducing the waste water to be purified into a vessel, adding iron chips to the waste water contained in said vessel, continuously removing lighter solid contaminations by overflowing waste water from the vessel, repeatedly drawing off a mixture of liquid and heavy solids containing added iron chips from near the bottom of the vessel, lifting said drawn off mixture above the liquid level in the vessel and into the air above said liquid level, mechanically spreading said mixture while above said liquid level and exposed to the air to separate heavy solids from said drawn off mixture and returning the remaining mixture components to said vessel, retaining the separated heavy solids in said spread state for a sufficient period of time to dry them, to destroy waste water films on the surfaces of the iron chips contained in the said separated heavy solids and to reactivate the last named iron chips by the action of the oxygen in the air and subsequently returning the separated heavy solids to the vessel while continuing to discharge waste water from the vessel.

2. In a process as claimed in claim 1, the additional step of passing the waste water after discharging it from the vessel to a biological purification plant.

3. In a process as claimed in claim 1, the additional step of continuously introducing the waste water to be purified into the vessel and continuously discharging it from said vessel in a quantity corresponding to the waste water feed.

References Cited in the file of this patent

UNITED STATES PATENTS

| 458,946 | Devonshire | Sept. 1, 1891 |
| 653,740 | Jewell | July 17, 1900 |
| 1,886,267 | Gleason et al. | Nov. 1, 1932 |
| 2,024,986 | Durdin | Dec. 17, 1935 |
| 2,116,053 | Urbain et al. | May 3, 1938 |
| 2,447,511 | Leaf | Aug. 24, 1948 |

FOREIGN PATENTS

| 840,980 | Germany | June 9, 1952 |
| 15,611 | Great Britain | Aug. 22, 1896 |